UNITED STATES PATENT OFFICE.

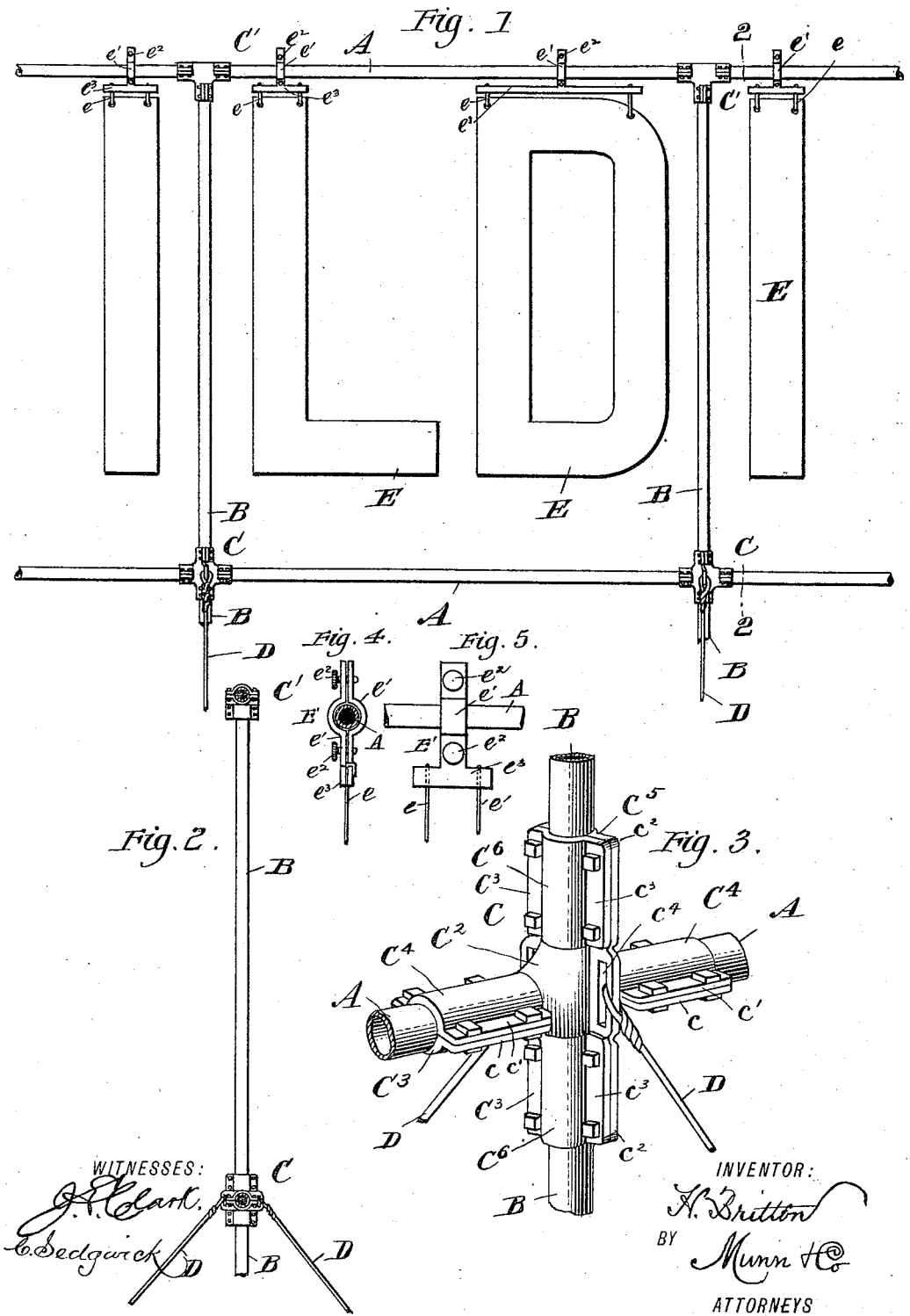

HENRY BRITTEN, OF LONDON, ENGLAND, ASSIGNOR TO JAMES WARNER, OF BROOKLYN, NEW YORK.

SIGN.

SPECIFICATION forming part of Letters Patent No. 443,955, dated December 30, 1890.

Application filed October 4, 1890. Serial No. 367,038. (No model.) Patented in England April 19, 1890, No. 2,665.

*To all whom it may concern:*

Be it known that I, HENRY BRITTEN, of London, England, have invented a new and Improved Sign, (for which I have obtained a patent in Great Britain, No. 2,665, dated April 19, 1890,) of which the following is a full, clear, and exact description.

My invention relates to improvements in signs.

It is well known that there are many objections to covering the fronts of buildings, especially nice ones, with the ordinary signs; and the object of my invention is to produce a simple, durable, and comparatively inexpensive sign, which may be conspicuously displayed upon the tops of buildings and other suitable supports, and which, while being provided with very large letters, will hold them in such a manner that there will be comparatively little strain upon the frame-work of the sign.

To this end my invention consists in certain features of construction and combination of parts, which will be hereinafter fully described, and then pointed out in the claims.

Reference is to be had to the accompanying drawings, forming a part of this specification, in which similar letters of reference indicate corresponding parts in all the figures.

Figure 1 is a broken front elevation of the sign embodying my invention. Fig. 2 is a vertical cross-section of the same on the line 2 2 of Fig. 1. Fig. 3 is a broken enlarged detailed view of one of the couplings for uniting the tubes or rods composing the sign-frame, and Figs. 4 and 5 broken detail views in cross-section and side elevation of the clamps for suspending the letters of the sign.

The sign-frame is composed of the parallel horizontal tubes A, the parallel vertical tubes B, and the couplings C and C', by which the tubes are united. The couplings C have a central body portion $C^2$, which is provided with intersecting bores arranged at right angles to each other, so as to receive the horizontal and vertical tubes A and B, and the body is provided with oppositely-extending horizontal arms $C^3$ and with oppositely-extending vertical arms $C^5$, the said arms being concave to fit the tubes A and B, and being provided, respectively, with laterally-extending flanges $c$ and $c^2$. The couplings are provided with concave plates $C^4$, which fit upon the horizontal tubes A and which are provided with laterally-extending flanges $c'$, corresponding in width and length to the couplings C on the arms $C^3$, so that when the tubes are placed in position in the arms $C^3$ the concave plates $C^4$ are placed thereon and the flanges $c$ and $c'$ are firmly bolted together, thus holding the tubes A securely in place. The couplings are also provided with concave plates $C^6$, adapted to fit the vertical tubes B and provided with laterally-extending flanges $c^3$, which correspond in size to the flanges $c^2$ on the arms $C^5$, so that when the tubes B are placed in position in the arms $C^5$ the plates $C^6$ may be placed over the tubes and the flanges $c^3$ and $c^2$ bolted together, thus securing the tubes B. It will be observed that the curved plates $C^4$ and $C^5$ are similar in size and shape, and it is desirable that they be made interchangeable.

The flanges $c^2$ run the entire height of the coupling on opposite sides and are provided centrally with slots $c^4$, adapted to receive the stay-rods D, which are attached to the flanges and which extend to the tops of the adjacent buildings or other supports, so as to brace the frame-work of the sign.

As the signs are usually longer than they are high, it is advisable to have the horizontal tubes A formed of a single piece extending through the couplings the entire length of the sign, and the vertical tubes B may be just long enough to extend from one tube A to the other. It will thus be seen that the frame-work of the sign will be made up of a series of squares, and the letters E, composing the word or words displayed by the sign, are loosely suspended from the upper tube A of each square by the links $e$ and clamps E', so that the letters may swing upon the rod, and when the wind blows against the letters they will be swung laterally and vertically and will not seriously strain the frame-work of the sign. The clamps E' comprise the two vertical strips $e'$, which are bent outwardly in the middle to embrace the tube A and which are united above and below the tube by the bolts $e^2$. The lower ends of the strips $e'$ terminate in the parallel horizontal bars $e^3$ and the upper ends of the links e pass between them and are formed into hooks to hang upon one of the bars as an additional precaution against displacement.

The couplings C', which are placed upon the upper horizontal rod A, are similar to the couplings C, already described, except that the upper arms C⁵ and the corresponding concave plates C⁶ are dispensed with and the couplings have a smooth top to prevent water from running in and rusting them, and they may be ornamented, if desired.

From the foregoing description it will be seen that the frame-work of the sign may be made of any desired size, and that the squares of the frame-work may be made large enough to contain any desired number of letters, and, while I have described the frame-work as being made up chiefly of tubes, solid rods may be substituted, if desired.

The frame-work is erected upon a suitable support and the lower vertical tubes or screwed-in flanges B may be elongated to carry the sign up to a desired height. The frame-work is braced by the stay-rods and tensions D, as described, and the letters E are suspended in the frame, and the letters may be suspended before the sign is raised, if desired.

Having thus fully described my invention, I claim as new and desire to secure by Letters Patent—

1. In a sign, the combination, with the tubes or rods arranged at right angles to each other, as shown, of the couplings comprising a central body portion having intersecting bores to receive the tubes or rods and having radially-extending concave flanged arms and concave flanged plates adapted to fit upon the tubes or rods and upon the flanges of the radially-extending arms, substantially as described.

2. In a sign, the coupling consisting, essentially, of a central body portion having intersecting bores, radially-extending concave flanged arms, concave flanged plates adapted to fit the radially-extending arms, and opposite side slots to connect with suitable stay-rods, substantially as described.

3. A sign comprising a series of tubes arranged at right angles to each other and connected at the points of intersection by couplings having radially-extending flanged arms to receive the tubes and flanged plates to fit the flanged arms, and letters suspended by links from the horizontal tubes, substantially as described.

HENRY BRITTEN.

Witnesses:
 EDWARD GILES WINN,
 PETER JAMES MORGAN.